(12) United States Patent
Gao et al.

(10) Patent No.: US 7,975,980 B2
(45) Date of Patent: Jul. 12, 2011

(54) ADJUSTABLE WATER VALVE OF TIME-CONTROLLED TYPE

(75) Inventors: Youyue Gao, Taipei (TW); Zhihong Gao, Taipei (TW)

(73) Assignee: Highplus International Co., Ltd., Taipei (TW)

( * ) Notice: Subject to any disclaimer, the term of this patent is extended or adjusted under 35 U.S.C. 154(b) by 336 days.

(21) Appl. No.: 12/377,656

(22) PCT Filed: Sep. 11, 2006

(86) PCT No.: PCT/CN2006/002339
§ 371 (c)(1),
(2), (4) Date: Feb. 16, 2009

(87) PCT Pub. No.: WO2008/031270
PCT Pub. Date: Mar. 20, 2008

(65) Prior Publication Data
US 2009/0242819 A1   Oct. 1, 2009

(51) Int. Cl.
*F16K 31/00*   (2006.01)
(52) U.S. Cl. .......... 251/48; 251/339; 251/900; 222/509; 239/583
(58) Field of Classification Search .............. 251/339, 251/229, 230, 319, 48, 900; 137/801; 4/678; 222/509; 119/72; 239/583
See application file for complete search history.

(56) References Cited

U.S. PATENT DOCUMENTS

| 4,187,804 | A |   | 2/1980  | Von Taschi |
|-----------|---|---|---------|------------|
| 4,512,551 | A | * | 4/1985  | Dalferth ........................ 251/339 |
| 4,940,206 | A | * | 7/1990  | Chung-Shan ................... 251/52 |
| 5,065,700 | A | * | 11/1991 | Cross ........................... 119/72.5 |
| 5,203,376 | A | * | 4/1993  | Chung-Shan ................ 137/801 |
| 5,704,397 | A | * | 1/1998  | Lu ............................. 137/630.15 |
| 6,739,572 | B2| * | 5/2004  | Shen et al. ..................... 251/52 |
| 6,942,195 | B2| * | 9/2005  | Kao ............................. 251/339 |
| 7,143,997 | B2| * | 12/2006 | Kao ............................. 251/339 |

FOREIGN PATENT DOCUMENTS

| CN | 2144226 Y    | 10/1993 |
| CN | 2242381 Y    | 12/1996 |
| CN | 2515463 Y    | 10/2002 |
| CN | 2636004 Y    | 8/2004  |
| CN | 1796852 A    | 7/2006  |
| JP | 2001-146979 A| 5/2001  |
| TW | 093138665    | 10/2006 |

* cited by examiner

*Primary Examiner* — John Bastianelli
(74) *Attorney, Agent, or Firm* — patenttm.us

(57) ABSTRACT

An adjustable water valve of time-controlled type consists of an inner shell and a time-controlled apparatus. The time-controlled apparatus is disposed inside the inner shell and includes an elastomer and a push rod. The elastomer is disposed between a support lid and the push rod. When the push rod is pushed into the inner shell, the water valve is opened, so the user can wash with the water ejected. After certain time, the water pressures are balanced and the elastomer which has been compressed will push the push rod back to its initial position to close the valve.

17 Claims, 9 Drawing Sheets

ADJUSTABLE WATER VALVE OF TIME-CONTROLLED TYPE

BACKGROUND OF THE INVENTION

1. Field of the Invention

The present invention is an adjustable water valve of time-controlled type and provides a device that after a certain time, the water pressures are balanced and the elastomer that has been compressed pushes the push rod back to its initial position to close the water valve.

2. Description of the Prior Arts

Infrared-controlled water valves are widely used for many years. The infrared rays-controlled water valves are used infrared sensors to control the water valve open and close. However, the infrared-controlled water valves consist of electronic elements, are actuated by electric power, are complicated and costs lot so that the infrared-controlled water valves are not widely used.

Accordingly, the inventor filed a Taiwan patent application No. 093138665 named "Self-closing type time-controlled water valve".

With reference to FIGS. 7 and 8, the conventional self-closing type time-controlled water valve comprises an outer shell (60), a mounting sleeve (70), a water-dispersing washer (80), an outflow partition (83), a water baffle (85), a control rod (90), a button (93), a time-controlled O-ring (95) and a bolt (96).

The outer shell (60) is a hollow barrel with two end openings and has an annular shoulder (61) being formed in a middle part of an inside wall thereof.

The mounting sleeve (70) has a mounting recess (71) being formed in a top end thereof. A mounting hole (73) and multiple water holes (72) are formed through a bottom of the mounting recess (71). An annular shoulder (74) is formed on an inside wall of the mounting recess (71). A protruding part (75) is formed around an outside wall of the mounting sleeve (70) and rubs against the annular shoulder (61) of the outer shell (60).

The water-dispersing washer (80) rubs against the annular flange (74) of the mounting sleeve (70) and has a through hole (81) being formed in a center thereof. Multiple water-dispersing holes (82) are formed around the through hole (81) at intervals.

The outflow partition (83) is mounted in the mounting sleeve (70). A bottom of the outflow partition (83) protrudes from the through hole (81) of the water-dispersing washer (80) toward a bottom of the mounting sleeve (70). A through hole (84) with radial branches is formed through the outflow partition (83) and correspond to the through hole (81) of the water-dispersing washer (80). A bottom opening of the through hole (84) has an inner conical surface being formed in an inside wall thereof.

The water baffle (85) is mounted in the outer shell (60) above the outflow partition (83) and has a through hole (86) being formed through a center thereof.

The control rod (90) is mounted in the through hole (84) of the outflow partition (83) and has a through hole (91). An annular flange (92) is formed around a bottom end of the control rod (90).

The button (93) is mounted through the mounting hole (73) of the mounting sleeve (70) and is mounted around the bottom end of the control rod (90). A threaded hole (94) is formed in a top end of the button (93).

The time-controlled O-ring (95) is mounted between the top end of the button (93) and the annular flange (92) of the control rod (90) and has an outside wall rubs against the inner conical surface of the through hole (84) of the outflow partition (83) or rubs against the inside wall of the outflow partition (83).

The bolt (96) is mounted through a waterproof O-ring (97) and the through hole (91) of the control rod (90) in sequence and is screwed into the threaded hole (94) of the button (93).

With further reference to FIG. 9, the aforementioned structure is connected to a faucet. When the button (93) is pushed into the mounting hole (73) and the through hole (84), the waterproof O-ring (97) is pushed by the control rod (90) to leave the through hole (86) of the water baffle (85). Then the fluid flows through the through hole (86) of the water baffle (85), flows into the outer shell (60) and flows out of the water holes (72) of the mounting sleeve (70). The time-controlled O-ring (95) is in the through hole (84) of the outflow partition (83) and moves toward the bottom end of the mounting sleeve (70). The outer edge of the time-controlled O-ring (95) rubs against the inside wall of the through hole (84). The abrasion forces the time-controlled O-ring (95) to move toward the bottom end of the mounting sleeve (70) with a lower speed. Therefore, the water valve maintains opened for a certain time to finish clean process.

However, after being used for a while, the outer edge of the time-controlled O-ring (95) and the inside wall of the through hole (84) are worn and the outer diameter of the time-controlled O-ring (95) is decreased to reduce the abrasion between the time-controlled O-ring (95) and the through hole (84). Therefore, the time-controlled O-ring (95) moves toward the bottom of the mounting sleeve (70) with a higher speed and the water valve is only open for a short time. Then the clean process cannot finish with such limited outflow time. To extend the outflow time so as to finish the clean process, the button (93) has to be pressed repeatedly or continuously to open the water valve for a long time. The aforementioned repeatedly or continuously pressing is inconvenient for clean process.

SUMMARY OF THE INVENTION

According to the inconvenient of the prior art, the present invention is an adjustable water valve of time-controlled type to provide a device that utilizes the balance of the water pressures and elasticity of the elastomer to close the water valve in an adjustable time.

To achieve the foregoing objective, the present invention is an adjustable water valve of time-controlled type that has an inner shell, a time-controlled apparatus and a top cover. A receiving recess is formed in a top end of the inner shell. A through hole is formed through a bottom of the receiving recess. The time-controlled apparatus has a push rod, an adjusting rod, an elastomer and a gasket. The push rod has a through hole. An aperture is formed through a sidewall of the push rod and communicates with the through hole. One end of the push rod is mounted through the through hole of the inner shell and the receiving recess of the inner shell in sequence. The adjusting rod is mounted in the through hole of the push rod. One end of the elastomer abuts the push rod. The gasket is mounted around a top end of the push rod. The gasket has an annular wing being formed around an edge thereof. The top cover is mounted above the inner shell. A support lid is formed on a center of the top cover. A mounting recess is formed in an inside wall of the support lid and abuts the other end of the elastomer. An inside wall of the mounting recess abuts the annular wing of the gasket. An annular channel is formed around the support lid. Multiple water inlets are formed through a bottom of the annular channel.

As described, when the push rod is pushed in the inner shell, the water from the faucet flows through the through hole of the inner shell. Then the elastomer is compressed by the support lid and the push rod and the water continuously flows in from the aperture of the push rod. When the water pressures in the mounting recess of the support lid and the receiving recess of the inner shell are balanced, the compressed elastomer returns to its original shape to provide a return force. The return force pushes the push rod to its original position so that the closing time of the water valve is determined by the size of the aperture of the push rod. The larger the aperture is, the quicker the water pressures in the mounting recess of the support lid and the receiving recess of the inner shell are balanced. On the contrary, the smaller the aperture is, the slower the water pressures are balanced. Therefore, the clean process is finished at a predetermined time and the present invention is convenient for use.

ELEMENTS REFERENCED NUMBER LIST

| (10) base body | (11) through hole |
|---|---|
| (12) annular rib | (13) threaded part |
| (20) bottom cover | (21) annular flange |
| (22) mounting recess | (23) fastening hole |
| (24) water hole | (30) inner shell |
| (31) outer shoulder | (32) receiving recess |
| (33) through hole | (34) inner shoulder |
| (40) time-controlled apparatus | (41) elastomer |
| (42) adjusting rod | (421) guiding head |
| (422) annular groove | (423) threaded part |
| (424) gap | (425) O-ring |
| (426) protruding part | (43) gasket |
| (431) annular wing | (44) push rod |
| (441) top recess | (442) middle recess |
| (443) O-ring | (444) through hole |
| (445) aperture | (446) upper shoulder |
| (447) inner threaded part | (448) outer threaded part |
| (449) lower shoulder | (45) collar |
| (451) receiving recess | (452) inner threaded part |
| (453) hole | (50) top cover |
| (51) annular flange | (52) annular channel |
| (53) water inlet | (54) filter |
| (55) upper ring | (56) support lid |
| (561) mounting recess | |
| (10A) base body | (20A) bottom cover |
| (30A) inner shell | (32A) receiving recess |
| (40A) time-controlled apparatus | (41A) elastomer |
| (42A) adjusting rod | (421A) guiding head |
| (44A) push rod | (444A) through hole |
| (4441A) neck | |
| (445A) aperture | (446A) upper shoulder |
| (50A) top cover | (56A) support lid |
| (561A) mounting recess | |
| (60) outer shell | (61) annular shoulder |
| (70) mounting sleeve | (71) mounting recess |
| (72) mounting hole | (73) water hole |
| (74) annular flange | (75) protruding part |
| (80) water-dispersing washer | (81) through hole |
| (82) water-dispersing hole | (83) outflow partition |
| (84) through hole | (85) water baffle |
| (86) through hole | (90) control rod |
| (91) through hole | (92) annular flange |
| (93) button | (94) threaded hole |
| (95) time-controlled O-ring | (96) bolt |
| (97) waterproof O-ring | |

DETAILED DESCRIPTION OF THE PREFERRED EMBODIMENTS

Figure 1:
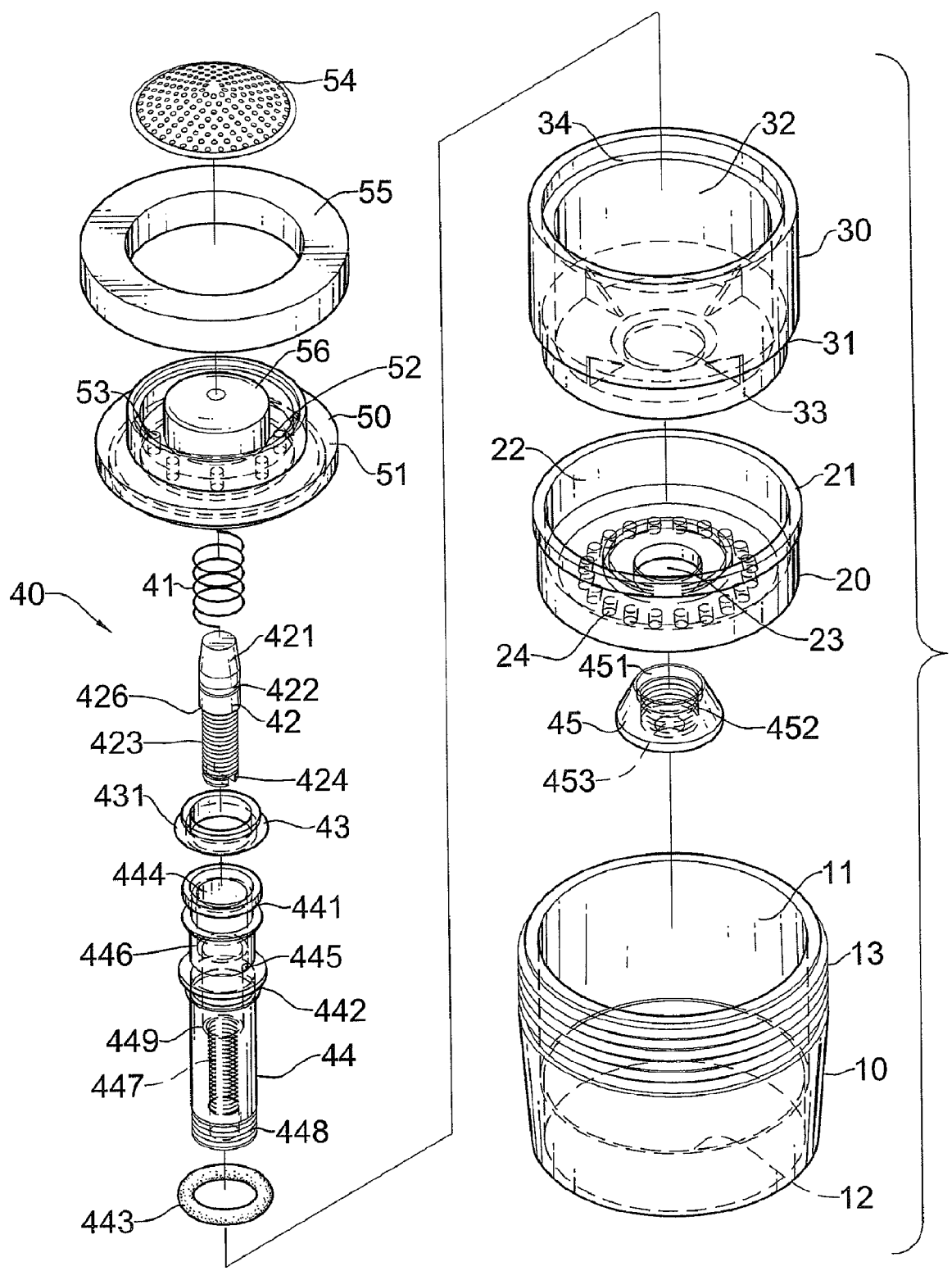
FIG. 1 is an exploded perspective view of a first embodiment of the present invention.
Figure 2:
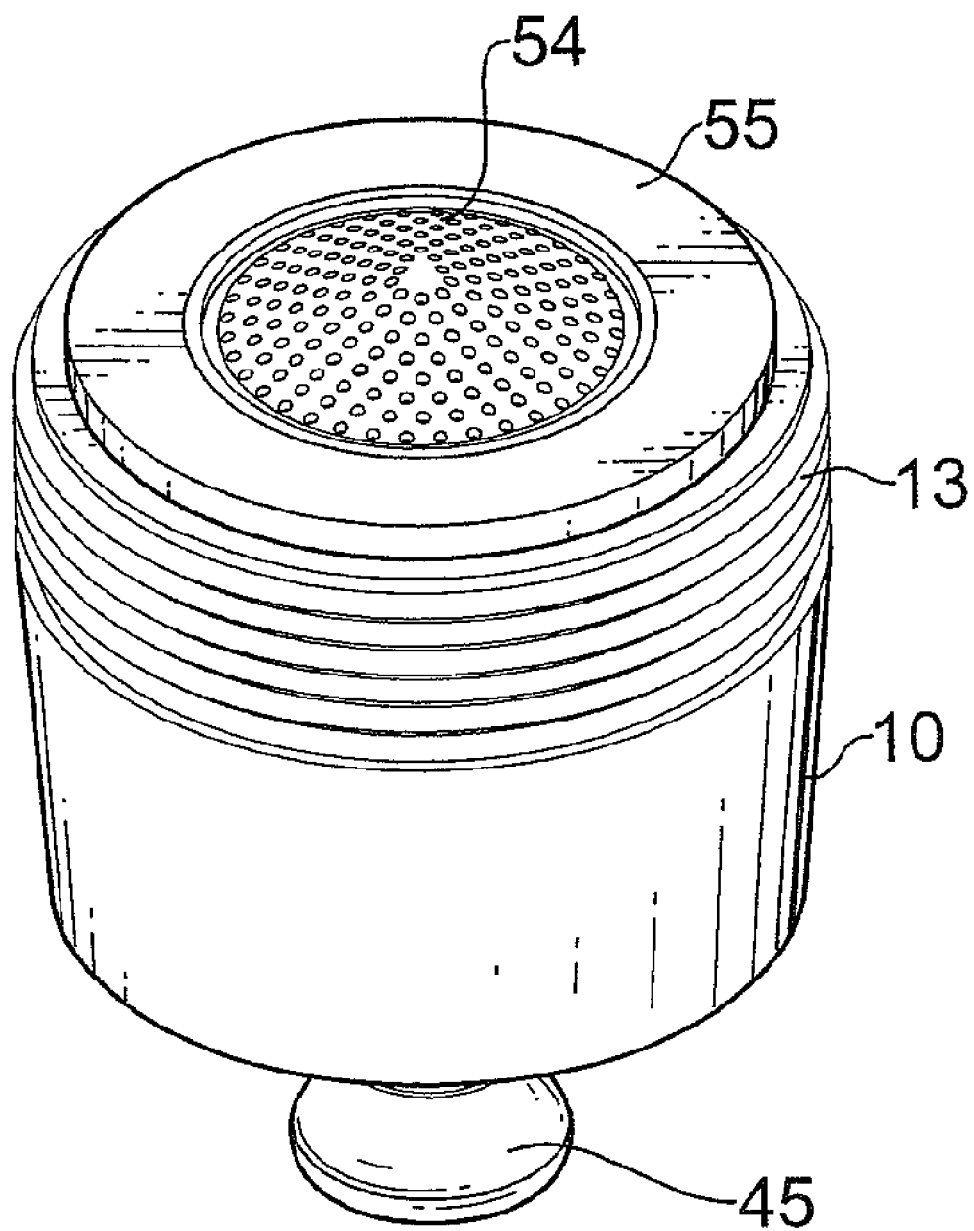
FIG. 2 is a perspective view of the first embodiment of the present invention.

The present invention is an adjustable water valve of time-controlled type. With reference to FIGS. 1 and 2, a first embodiment of the present invention comprises a base body (10), a bottom cover (20), a inner shell (30), a time-controlled apparatus (40) and a top cover (50).

The base body (10) is a hollow shell and has a through hole (11) being formed through a top end and a bottom end of the base body (10). An annular rib (12) is formed around an inside wall of the through hole (11) adjacent to the bottom end of the base body (10). A threaded part (13) is formed around an outside wall of the base body (10) adjacent to the top end thereof.

The bottom cover (20) is mounted in the through hole (11) of the base body (10). An annular flange (21) is formed around an outside wall of the bottom cover (20) and abuts the annular rib (12) of the base body (10). A mounting recess (22) is formed in a top surface of the bottom cover (20). A fastening hole (23) is formed through a center of a bottom surface of the mounting recess (22). Multiple water hole (24) are formed through the bottom surface of the mounting recess (22) around the fastening hole (23) at intervals.

The inner shell (30) is mounted in the base body (10). An outer shoulder (31) is formed around an outside wall of the inner shell (30) and abuts an annular edge of the mounting recess (22) of the bottom cover (20). A receiving recess (32) is formed in a top end of the inner shell (30). A through hole (33) is formed through a bottom of the receiving recess (32). An inner shoulder (34) is formed around an inside wall of the receiving recess (32).

The time-controlled apparatus (40) has a push rod (44), an adjusting rod (42), an elastomer (41), a gasket (43) and a collar (45).

The push rod (44) has a top recess (441) being formed around an outside wall at a top end thereof. A middle recess (442) is formed around the outside wall at a middle part of the push rod (44). An O-ring (443) is mounted in the middle recess (442). The O-ring (443) selectively seals the through hole (33) of the inner shell (30). The push rod (44) has a through hole (444). An aperture (445) is formed between the middle recess (442) and the top recess (441) and communicates with the through hole (444). An upper shoulder (446) is formed around an inside wall of the through hole (44) adjacent to the aperture (445). An inner threaded part (447) is formed on the inside wall of the through hole (444) adjacent to a bottom end thereof. An outer threaded part (448) is formed around a sidewall of the push rod (44) adjacent to a bottom end thereof. The end of the push rod (44) with the outer threaded part (448) is mounted through the through hole (33) of the inner shell (30), a fastening hole 6 (23) of the bottom cover (20) and the through hole (11) of the base body (10) in sequence and protrudes out of the base body (10). A lower shoulder (449) is formed around an inside wall of the push rod (44) adjacent to the inner 9 threaded part (447).

The adjusting rod (42) is mounted in the through hole (444) of the push rod (44). A conical guiding head (421) is formed on a top end of the adjusting rod (42). An annular groove (422) is formed around the adjusting rod (42) adjacent to the guiding head (421). An O-ring (425) is mounted in the annular groove (422). A threaded part (423) is formed around a sidewall of the adjusting rod (42) adjacent to a bottom end thereof. The threaded part (423) is screwed onto the inner threaded part (447) of the push rod (44). A slit (424) is formed in the bottom end of the adjusting rod (42). A screwdriver with flat tip protrudes into the slit (424) and is rotated to adjust the longitudinal movement of the adjusting rod (42) in the through hole (444) of the push rod (44) (i.e. moving up and down relative to the push rod (44)). Therefore, the inflow water quantity is adjusted. A protruding part (426) is formed on the adjusting rod (42) adjacent to the threaded part (423) and abuts the lower shoulder (449) of the push rod (44).

The elastomer (41) abuts the upper shoulder (446) of the push rod (44) at one end thereof. The elastomer (41) may be a spring.

The gasket (43) is mounted in the top recess (441) of the push rod (44). An annular wing (431) is formed around an annular edge of the gasket (43).

A collar (45) has a receiving recess (451). An inner threaded part (452) is formed on an inside wall of the receiving recess (451) and is screwed onto the outer threaded part (448) of the push rod (44) to connect the collar (45) with the bottom end of the push rod (44). A hole (453) is formed through a bottom surface of the receiving recess (451).

The top cover (50) is mounted in the through hole (11) of the base body (10). An annular flange (51) is formed on an annular edge of the top cover (50) and abuts the inner shoulder (34) of the inner shell (30). A support lid (56) is formed on a center of the top cover (50). A mounting recess (561) is formed in an inside wall of the support lid (56) and abuts the other end of the elastomer (41). An inside wall of the mounting recess (561) abuts the annular wing (441) of the gasket (44). An annular channel (52) is formed around the support lid (56). Multiple water inlets (53) are formed through a bottom of the annular channel (53). A filter (54) is mounted on the annular channel (52). An upper ring (55) is mounted on the annular flange (51) of the top cover (50). The upper ring (55) abuts the annular flange (51) of the top cover (50) to fasten the top cover (50) on the base body (10).

Figure 3:
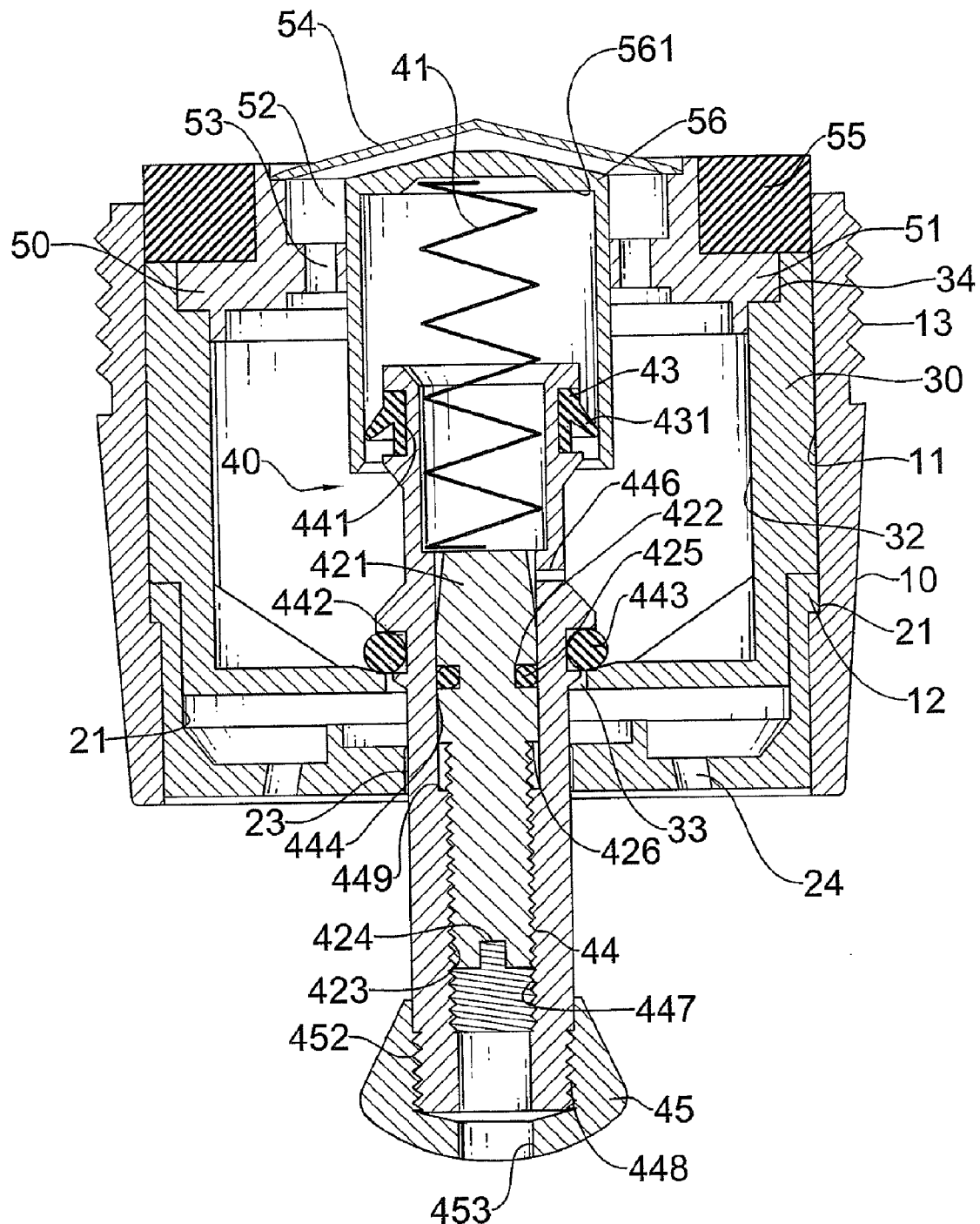
FIG. 3 is a cross-sectional view of the first embodiment of the present invention.
Figure 4:
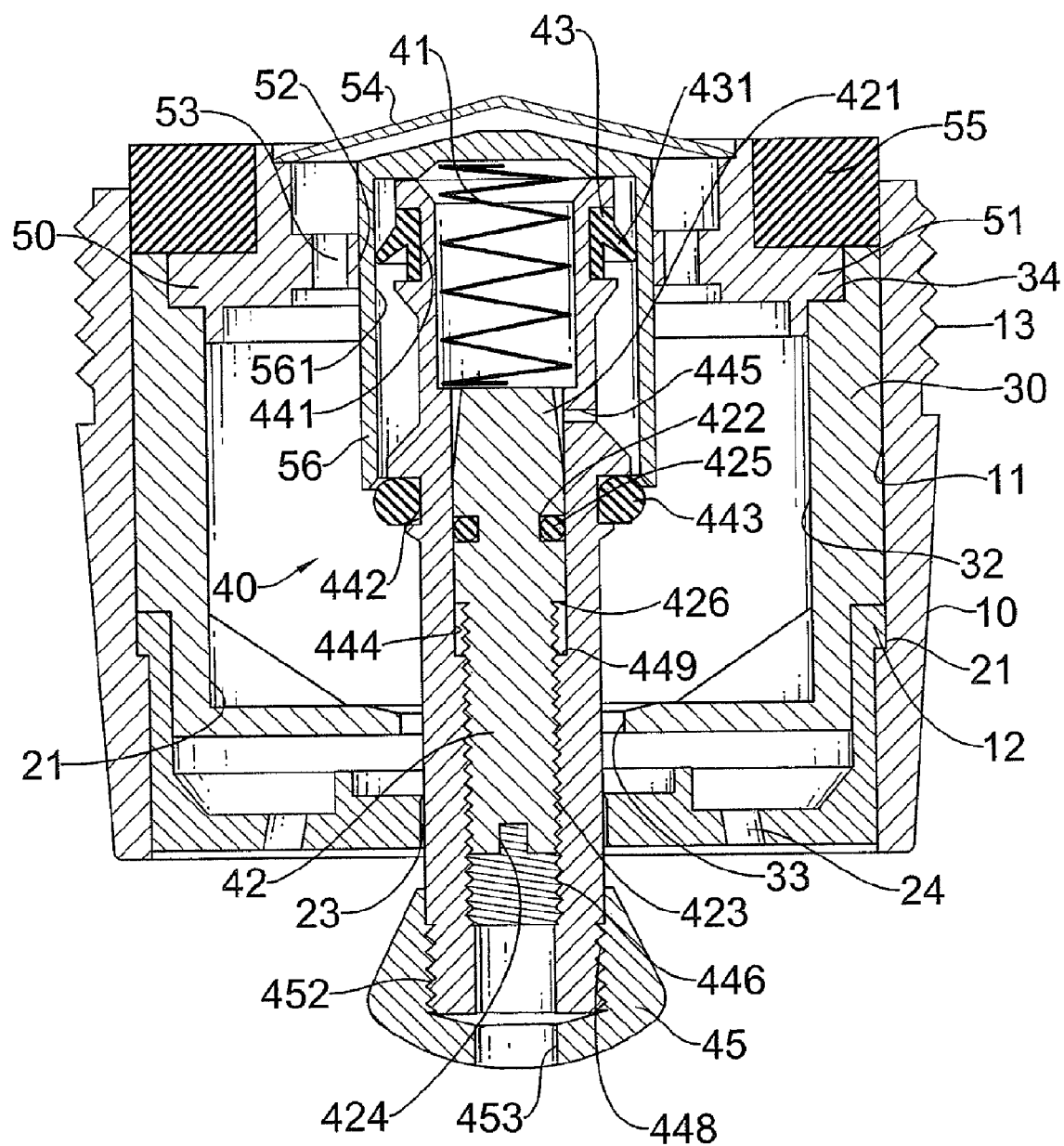
FIG. 4 is an operational cross-sectional view of the first embodiment of the present invention.

With further reference to FIGS. 3 and 4, the base body (10) is screwed in the water outlet of a faucet. When the push rod (44) is pushed in the inner shell (30), the push rod (44) compresses the elastomer (41) to drain water from the mounting recess (561) of the support lid (56), which results in the pressure differences between the mounting recess (561) of the support lid (56) and the receiving recess (32) of the inner shell (30). The elasticity of the elastomer (41) is not enough to resist the pressure differences to push the push rod (44) reposition. Therefore, the O-ring (443) of the push rod (44) leaves the through hole (33) of the inner shell (30) to open the through hole (33). Then the water from the faucet flows through the filter (54), the water inlets (53) of the top cover (50) and the through hole (33) of the inner shell (30) in sequence and flows out from the water holes (24) of the bottom cover (20) to proceed the clean process.

In the meantime, the water is filled with the receiving recess (32) of the inner shell (30) and flows into the mounting recess (561) of the support lid (56) through the O-ring (443) of the push rod (44) and the bottom edge of the support lid (56). When the water is gradually filled with the mounting recess (561), the water also flows in the through hole (444) of the push rod (44) through the aperture (445) of the push rod (44).

When the water pressures in the through hole (444) of the push rod (44), the mounting recess (561) of the support lid (56) and the receiving recess (32) of the inner shell (30) are the same, the pressures differences are eliminated and the elastomer (41) pushes the push rod (44) reposition.

During a certain time, when the push rod (44) is pushed to original position, the O-ring (443) of the push rod (44) seals the through hole (33) of the inner shell (30) so that the water cannot flow out of the inner shell (30). Therefore, the water stops flowing. Meanwhile, the water is filled with the receiving recess (32) of the inner shell (30), and between the through hole (444) of the push rod (44) and the mounting recess (561) of the support lid (56).

To allow the water to flow again, the push rod (44) is pushed into the inner shell (30) again. The water filled between the through hole (444) of the push rod (44) and the mounting recess (561) of the support lid (56) forces the annular wing (431) of the gasket (43) to retract toward the push rod (45). Then the water can flow into the receiving recess (32) of the inner shell (30). The flowing direction of the water is as described above and is not discussed again.

To control the return force of the elastomer (41), a screwdriver with flat top protrudes from the hole (453) of the collar (45) to the through hole (444) of the push rod (44) and is mounted into the slit (434) of the bottom end of the adjusting rod (43). Then, rotating the adjusting rod (43) adjusts the position of the adjusting rod (43) relative to the push rod (44), and the guiding head (421) of the adjusting rod (43) is therefore adjusted to change its position relative to the aperture (445) of the push rod (44). Therefore, the opening size of the aperture (445) of the push rod (44) is adjusted. When the opening size of the aperture (445) is larger, the water flows in quicker and the time to eliminate the pressure differences is shorter. On the contrary, when the opening size of the aperture (445) is smaller, the time to eliminate the pressure differences is longer. Thus, the time length to eliminate the pressure differences is based on the return force of the elastomer (41).

In conclusion, the closing time of the water valve is determined by the water pressures balances between the inner shell (30), the push rod (44) and the support lid (56) and by the return force of the elastomer (41). Therefore, the closing time of the water valve is maintained to allow the clean process to finish at the time.

Additionally, in another embodiments, the inner shell (30) and the time-controlled apparatus (40) are fastened to the water outlet of the faucet.

Figure 5:
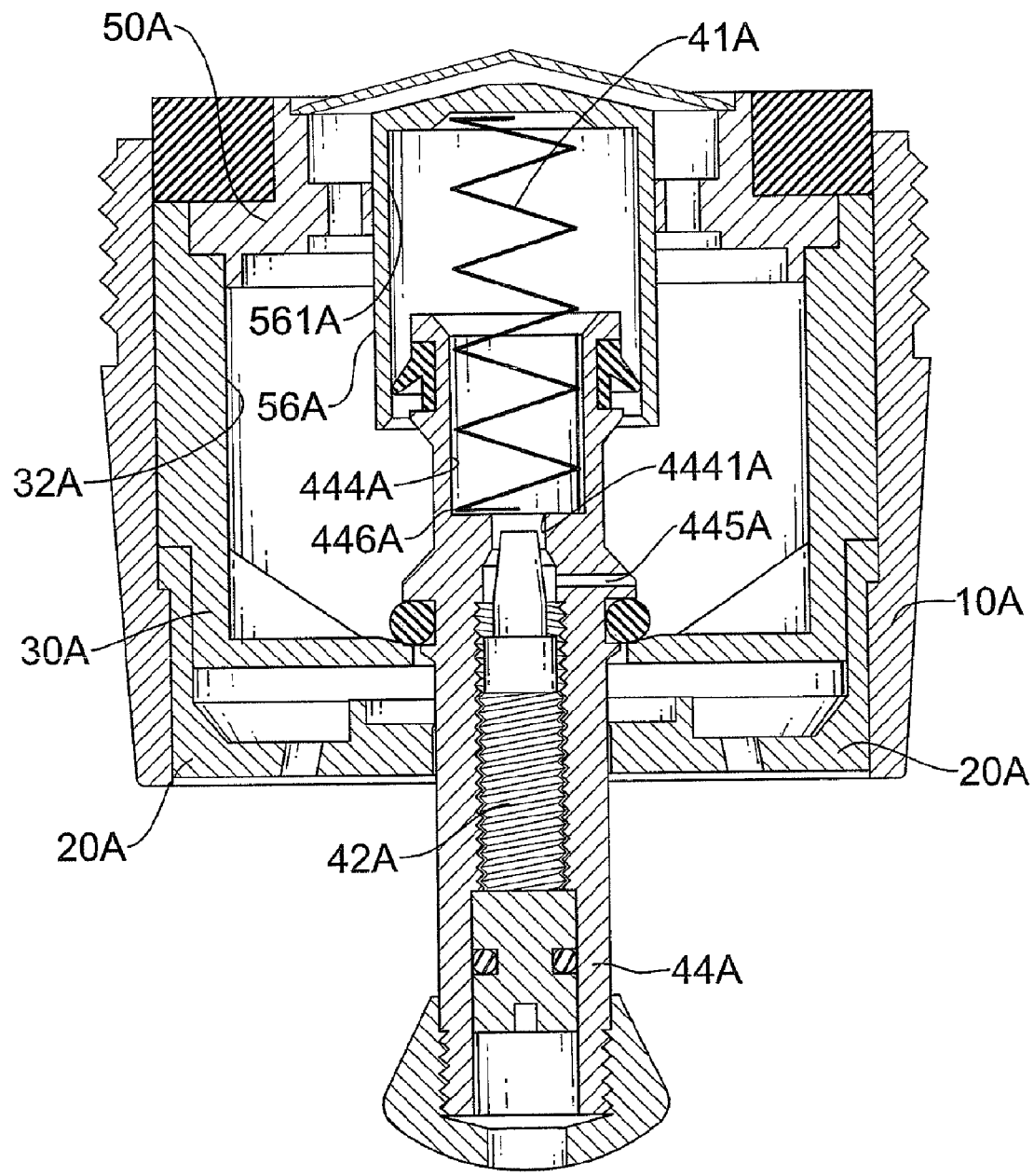
FIG. 5 is a cross-sectional view of a second embodiment of the present invention.
Figure 6:
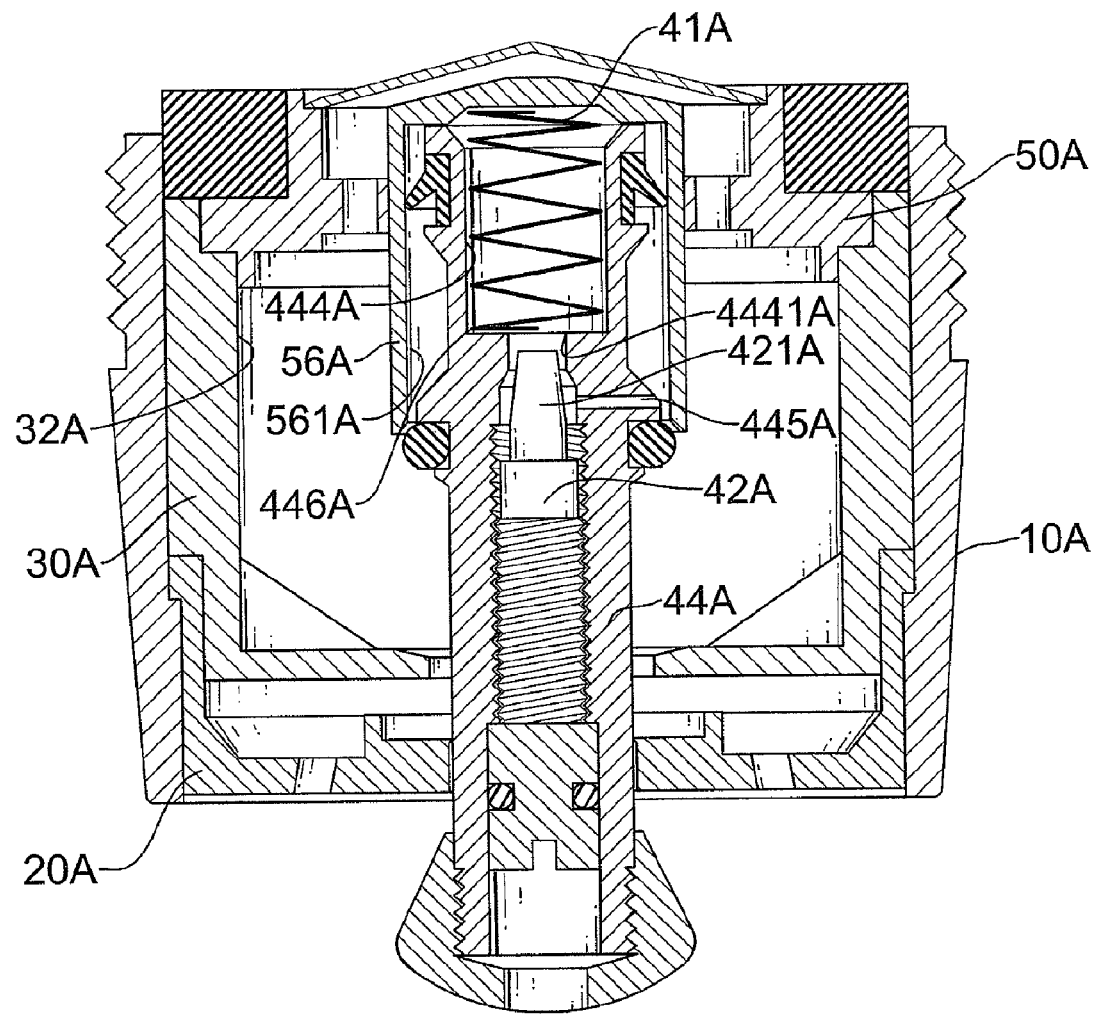
FIG. 6 is an operational cross-sectional view of the second embodiment of the present invention.
Figure 7:
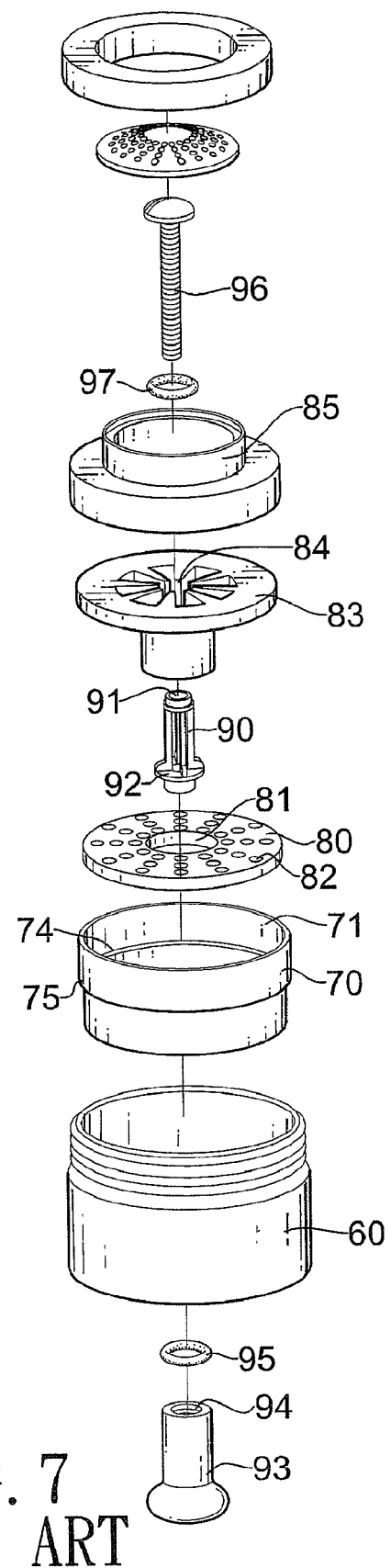
FIG. 7 is an exploded perspective view of the self-closing type time-controlled water valve.
Figure 8:
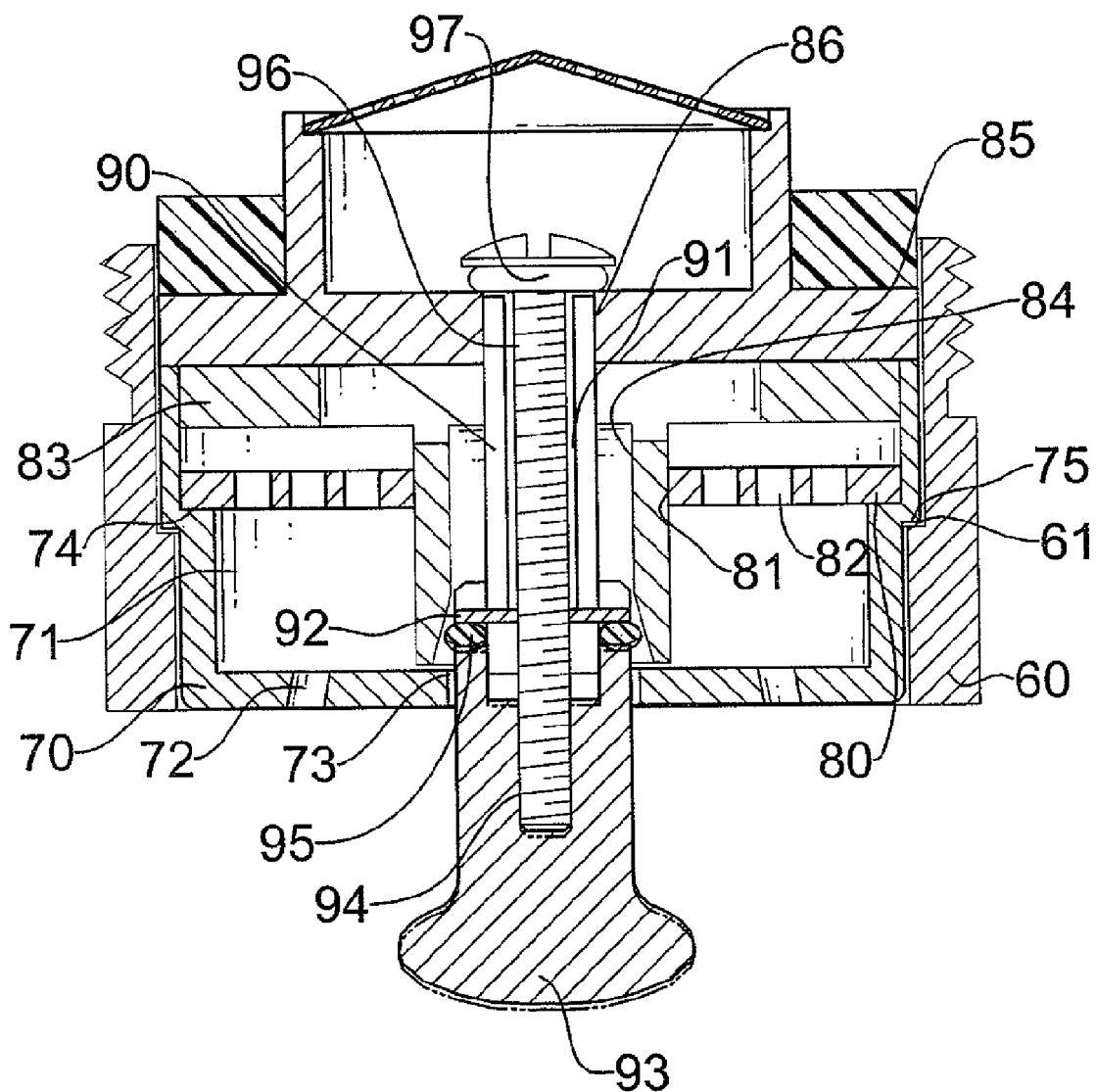
FIG. 8 is a cross-sectional view of the self-closing type time-controlled water valve.
Figure 9:
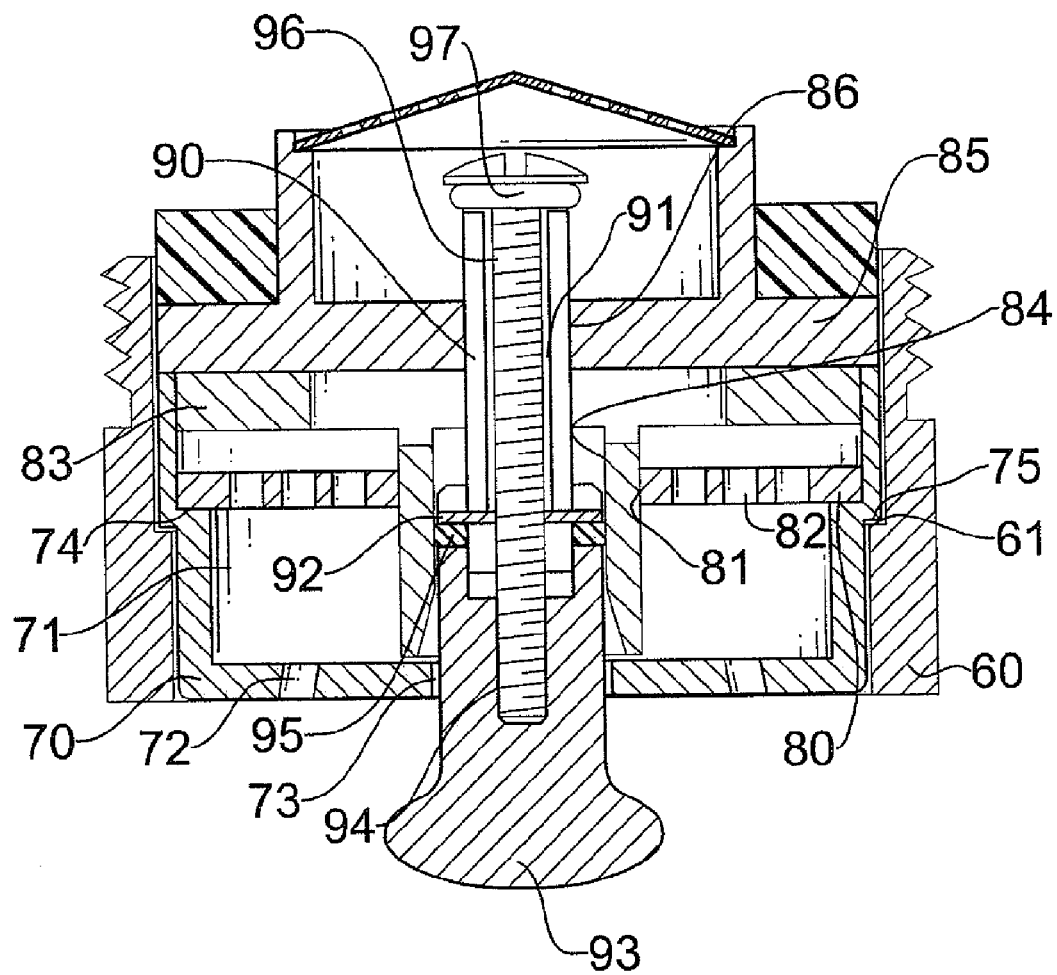
FIG. 9 is an operational cross-sectional view of the self-closing type time-controlled water valve.

With reference to FIGS. 5 and 6 showing the second embodiment of the present invention. The base body (10A), the bottom cover (20A), the inner shell (30A), the time-controlled apparatus (40A) and the top cover (50A) are the same with those in the first embodiment and are not discussed here.

A neck (4441A) is formed in the through hole (444A) of the push rod (44A) between the aperture (445A) and the upper shoulder (446A). The guiding head (421A) of the adjusting rod (42A) is tapered.

When the water flows into the through hole (444A) from the aperture (445A) of the push rod (44A) and flows into the mounting recess (561A) of the support lid (56A) from the through hole (444A), the water quantity is limited by the distance between the neck (4441A) and the guiding head (421A) of the adjusting rod (42A). When the distances between them are shorter, the water quantity is lesser. Therefore, the water pressures in the through hole (444A) of the push rod (44A), the mounting recess (561A) of the support lid (56A) and the receiving recess (32A) of the inner shell (30A) needs longer time to be the same. Then the return time of the elastomer (41A) is relative longer to open the water valve longer. On the contrary, when the distances between them are longer, the water quantity is larger. Therefore, the water pressures in the through hole (444A) of the push rod (44A), the mounting recess (561A) of the support lid (56A) and the receiving recess (32A) of the inner shell (30A) needs shorter time to be the same. Then the return time of the elastomer (41A) is relative shorter to open the water valve shorter.

What is claimed is:

1. An adjustable water valve of time-controlled type comprising:
    an inner shell having a receiving recess being formed in a top end of the inner shell and a through hole being formed through a bottom of the receiving recess;
    a time-controlled apparatus having a push rod, an adjusting rod, an elastomer and a gasket;
    the push rod having a through hole, an aperture being formed through a sidewall of the push rod and communicating with the through hole, and an end being mounted through the through hole of the inner shell and protruding into the receiving recess of the inner shell;
    the adjusting rod being mounted in the through hole of the push rod;
    the elastomer abutting the push rod at one end thereof;
    the gasket being mounted around a top end of the push rod, and an annular wing being formed around an annular edge of the gasket; and
    a top cover being mounted above the inner shell and having a support lid being formed on a center of the top cover, a mounting recess being formed in an inside wall of the support lid and abutting the other end of the elastomer, an inside wall of the mounting recess abutting the annular wing of the gasket, an annular channel being formed around the support lid, and multiple water inlets being formed through a bottom of the annular channel.

2. The adjustable water valve of time-controlled type as claimed in claim 1, wherein
    an upper shoulder is formed around an inside wall of the through hole adjacent to the aperture and abuts the elastomer; and
    a guiding head is formed on a top end of the adjusting rod.

3. The adjustable water valve of time-controlled type as claimed in claim 2, wherein
    a neck is formed in the through hole of the push rod between the aperture and the upper shoulder; and
    the guiding head of the adjusting rod is tapered.

4. The adjustable water valve of time-controlled type as claimed in claim 1 wherein an O-ring is mounted in a middle part of the push rod and selectively seals the through hole of the inner shell.

5. The adjustable water valve of time-controlled type as claimed in claim 4, wherein a middle recess is formed around an outside wall at the middle part of the push rod and the O-ring is mounted in the middle recess.

6. The adjustable water valve of time-controlled type as claimed in claim 5 further comprising a base body and a bottom cover, wherein
    the base body has a through hole being mounted around the inner shell; and
    the bottom cover is mounted in the through hole of the base body and has a mounting recess being formed in a top surface of the bottom cover, a fastening hole being formed through a center of a bottom surface of the mounting recess and being mounted around the push rod, and multiple water hole being formed through the bottom surface of the mounting recess around the fastening hole at intervals.

7. The adjustable water valve of time-controlled type as claimed in claim 6, wherein
    the adjusting rod has an annular groove, an O-ring is mounted in the annular groove, and a threaded part is formed around a sidewall of the adjusting rod adjacent to a bottom end thereof; and
    an inner threaded part is formed on the inside wall of the through hole adjacent to a bottom end thereof and is screwed onto the threaded part of the adjusting rod.

8. The adjustable water valve of time-controlled type as claimed in claim 7, wherein
    a protruding part is formed on the adjusting rod adjacent to the annular groove; and
    a lower shoulder is formed around an inside wall of the push rod and abuts the protruding part of the adjusting rod.

9. The adjustable water valve of time-controlled type as claimed in claim 8, wherein a slit is formed in the bottom end of the adjusting rod.

10. The adjustable water valve of time-controlled type as claimed in claim 9, wherein a collar is connected to the bottom end of the push rod and has a hole.

11. The adjustable water valve of time-controlled type as claimed in claim 10, wherein
    an annular rib is formed around an inside wall of the through hole adjacent to a bottom end of the base body; and
    an annular flange is formed around an outside wall of the bottom cover and abuts the annular rib of the base body.

12. The adjustable water valve of time-controlled type as claimed in claim 11, wherein an outer shoulder is formed around an outside wall of the inner shell and abuts an annular edge of the mounting recess of the bottom cover.

13. The adjustable water valve of time-controlled type as claimed in claim 12, wherein
    an inner shoulder is formed around an inside wall of the receiving recess of the inner shell; and
    an annular flange is formed on an annular edge of the top cover and abuts the inner shoulder of the inner shell.

14. The adjustable water valve of time-controlled type as claimed in claim 13, wherein a filter is mounted on the annular channel, and an upper ring is mounted on the annular flange of the top cover and abuts the annular flange of the top cover.

15. The adjustable water valve of time-controlled type as claimed in claim 14, wherein
    an outer threaded part is formed around the sidewall of the push rod adjacent to the bottom end thereof; and
    the collar has a receiving recess having an inner threaded part being formed on an inside wall of the receiving recess and being screwed onto the outer threaded part of the push rod.

16. The adjustable water valve of time-controlled type as claimed in claim 15, wherein a threaded part is formed around an outside wall of the base body adjacent to the top end thereof.

17. The adjustable water valve of time-controlled type as claimed in claim 16, wherein the elastomer is a spring.

* * * * *